April 16, 1957 W. E. MILLER ET AL 2,789,027

MULTIPLE STYLUS

Filed March 10, 1954 2 Sheets-Sheet 1

INVENTORS
W. E. MILLER
F. G. HALLDEN

BY M. J. Reynolds
ATTORNEY

*INVENTORS*
W. E. MILLER
F. G. HALLDEN

BY

M. J. Reynolds
ATTORNEY

2,789,027
MULTIPLE STYLUS

William E. Miller, North Bergen, N. J., and Frederick G. Hallden, Bellerose, N. Y., assignors to The Western Union Telegraph Company, New York, N. Y., a corporation of New York Application March 10, 1954, Serial No. 415,335
6 Claims. (Cl. 346—74)

This invention is concerned with electric marking facsimile recorders, and more particularly with an improved stylus mounting structure for such recorders of the type having rotating recording drums.

Facsimile transceivers utilizing this type of recording customarily employ a stylus of fine tungsten wire to contact the message paper, such message paper being mounted on the surface of a rotating drum. The same stylus often is used for both transmitting and receiving, and it is found in practice that wearing down of the stylus wire, in spite of its construction of such a hard and durable material as tungsten, is so rapid as to necessitate adjustment and replacements of the stylus which are undesirably frequent. The necessity for replacement and readjustment is especially objectionable in cases where the transceiver device is installed on the premises of a subscriber to facsimile services, who is not an employer of such technical personnel as would be competent to make the replacement; a condition of frequent occurrence. In such instances the cost of obtaining the necessary service assistance is disproportionately large in view of the minor nature of such stylus servicing, because of overhead and traveling expense involved in performing the service.

It is accordingly an object of this invention to provide a means of extending the period of facsimile operation between required stylus adjustments.

Another object of the present invention is to provide an automatic method of replacing a worn facsimile stylus.

Still another object of the invention is to improve the quality of stylus recordings by making it unnecessary to use a stylus beyond its interval of proper adjustment because of difficulty or delay in obtaining service for the machine.

Further objects will be evident from a consideration of the following description of the invention, when taken in conjunction with the drawings, in which Fig. 1 is a sectional view of a facsimile transceiver constructed in accordance with the present invention;

Figure 1:
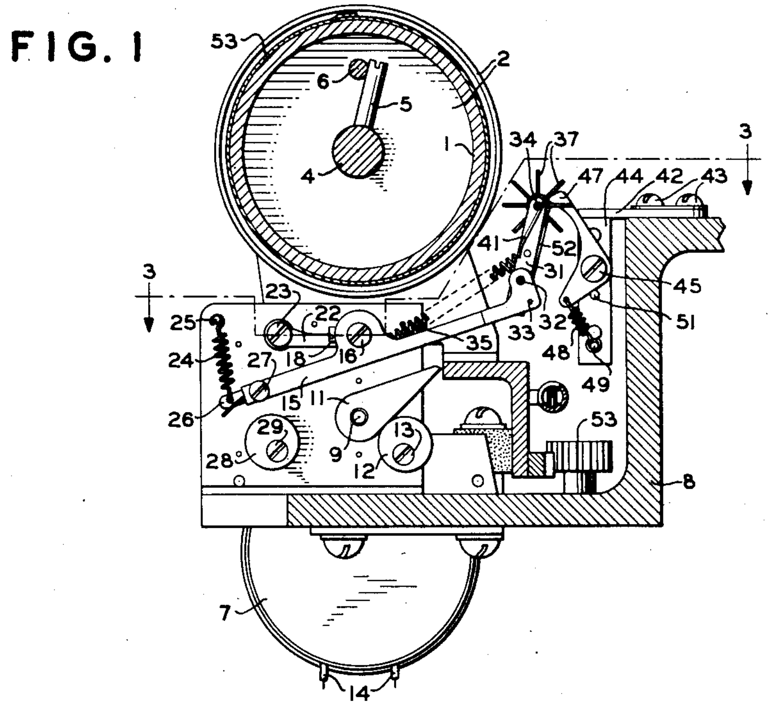
Figure 3:
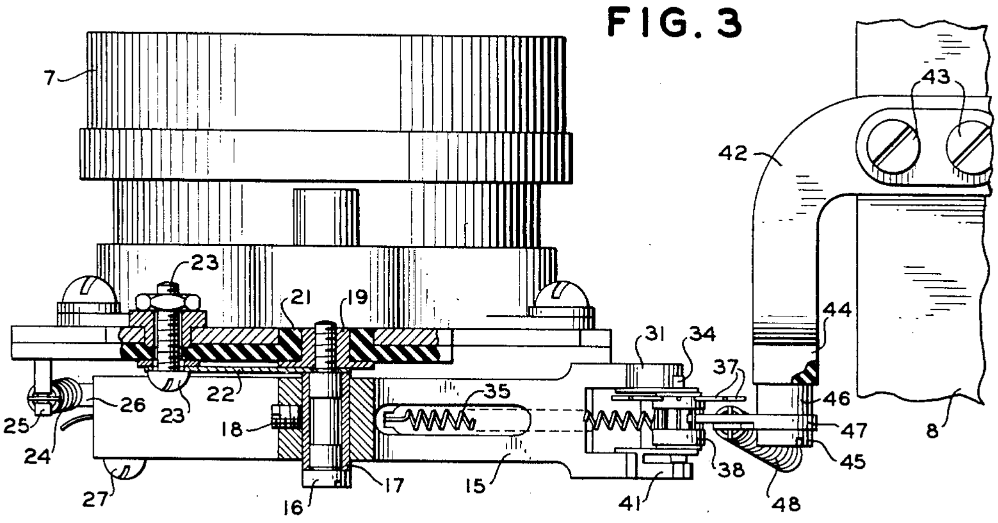
Fig. 3 is a sectional view of a portion of Fig. 1.
Figures 4, 6:
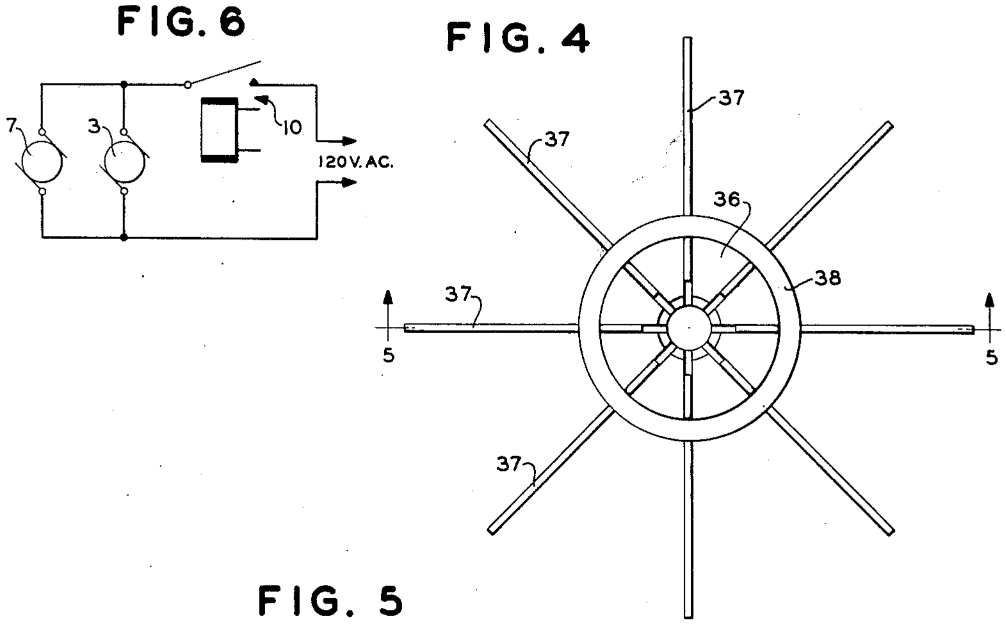
Fig. 4 is a profile view of a stylus turret embodied in the present invention.

Referring now to Fig. 1, there is shown a section in profile of a facsimile transceiver which employs a rotatable drum 1, having an end plate 2 attached thereto, and slidably mounted on a shaft 4 which is turned by a motor not shown on the drawing, but which is indicated schematically as 10 on Fig. 6. The said shaft turns the drum 1 by means of a pin 5 screwed into a tapped radial hole in the shaft, and bearing against a longitudinal bar 6 rigidly connected to the drum by being affixed to the said end plate. A hysteresis motor 7, having internal speed reducing gears is bolted to the machine frame 8 and has a shaft 9 to which is secured a cam 11 made of insulating material such as Bakelite. When motor 7 is idle, cam 11 rests against the eccentric stop 12 which is adjustable as to position by means of screw 13 whereby it is fastened to machine frame 8 through an eccentric hole in the said stop. When motor 7 is energized over the wires 14, as is done when it is desired to record a message, the rotation of shaft 9 raises the finger of cam 11 into contact with the lever 15, turning the said lever about the shoulder screw 16 as a pivot, the bushing 17 acting as a bearing fastened to the lever 15 by means of set screw 18, as seen more clearly in Fig. 3. The shoulder screw 16 engages a bushing 19 which is firmly secured in the strip of insulating material 21 and makes contact with a metal strap 22 which is retained by the insulated terminal bolt 23. A coiled tension spring 24 is hooked over a grooved stud 25 screwed into the frame 8 and the other end of the said spring is hooked into a hole in a tab of insulating material 26 which is fastened to lever 15 by a screw 27. It is thus seen that the lever 15 is insulated from all contact with the frame 8, and is electrically connected to the terminal bolt 23.

Figure 2:
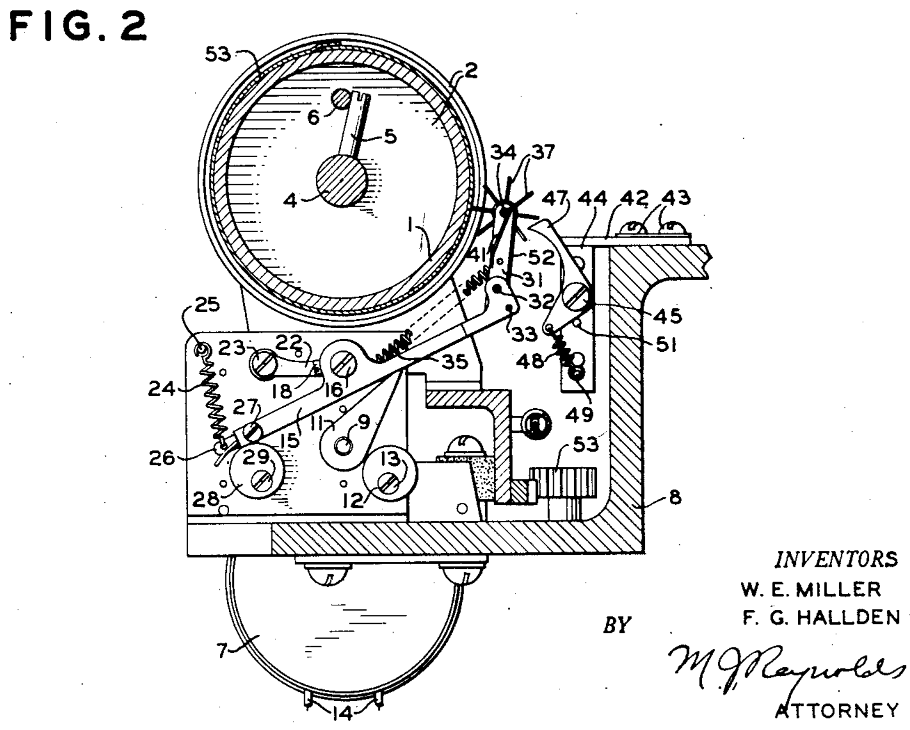
Fig. 2 shows the position of the parts of Fig. 1, when the transceiver is in operation.
Figure 5:
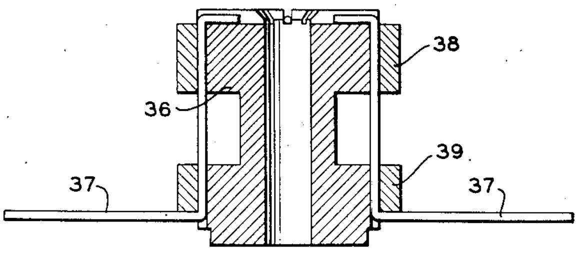
Fig. 5 is a sectional view of Fig. 4.

In Fig. 2 the lever 15 is seen to rest against eccentric stop 28 which is secured to the frame 8 by the screw 29, during times when the motor 7 is energized to move lever 15 to the advanced position. Attached to a yoke formed in the end of the lever 15 is an arm 31 secured thereto by a pivot 32, and normally retained in contact with pin 33 through the said yoke by means of the tension spring 35 attached thereto. Arm 31 is provided with a yoke at its free end in which are located appropriate bearing holes to retain shaft 34 on which is mounted a rotatable stylus turret as shown in detail in Figs. 4 and 5. The said stylus turret comprises a metal spool 36 having an appropriate number of longitudinal notches such as eight, and a corresponding number of tungsten wire styluses 37 inserted in the said grooves, bent radially outward at one end of the said spool, and radially inward in connecting radial grooves at the other end of the said spool. Sleeves 38 and 39 are pressed over the styluses 37 to retain them in position on the spool. A friction spring 41 (Fig. 1) imposes a slight load on the shaft 34 to prevent undesired rotation of the stylus turret assembly except when such rotation is caused by the mechanism next to be described.

A metal bracket 42 secured to the machine frame 8 by screws 43 carries a strip of insulating material 44 into which is threaded a shoulder screw 45 which, with its associated sleeve 46, acts as a bearing for the pawl 47 whose finger engages the styluses 37 at a point between the sleeves 38 and 39 where the styluses function as a lantern pinion. Oscillation of the arm 15 consequent to energizing the motor 7 draws the stylus turret assembly across pawl 47, sliding it across one stylus, the spring 48 connected between the tail of the pawl and the fixed stud 49 on the insulating strip 44 then causing the pawl to drop into the space behind that stylus. Deenergizing the motor 7 causes arm 15 to return to its rest position, drawing the stylus turret assembly across pawl 47 and rotating the said assembly one-eighth turn in a counterclockwise direction. A stop pin 51 secured in the insulating strip 44 limits the advance of the pawl 47 to an amount sufficient to engage the styluses 37. A leaf-spring 52 is fastened at its lower extremity to the arm 31, having its free end terminated at the level of shaft 34 to act as a click on the rotation of the said stylus turret.

It is therefore seen that successive operations of the motor 7 are effective to advance the rotatable stylus turret stepwise through the action of pawl 47 against the turret, that reverse rotation is prevented by flat spring 52, and that unwanted forward rotation is prevented by the normal frictional drag of the recording paper 53 against the stylus, as well as by the spring 41. The effect of the above described forward ratcheting stylus rotation is to present a different stylus 37 to be pressed into place on the recording paper 53 by the uniform pressure of the spring 35, at every operation of the motor 7, to the extent that the number of styluses employed will permit before the first stylus is again rotated into position. The motor 7 is used solely for the purposes of advancing styluses 37 against the record paper 53 with writing pressure and retracting them at the end of a message to provide access to the paper 53 for its removal and replacement. A different stylus is therefore presented for use on each successive message and since each stylus is used in producing only a fractional part of the entire number of messages reproduced, the fractional part being one eighth in the instance shown, the life of each stylus before adjustment or replacement thereof is required is increased by a factor of eight.

In Fig. 6 is shown an electrical circuit diagram wherein the motor 7 which operates the stylus advancing mechanism of the instant invention is seen to be connected in parallel with a motor 3 which operates the carriage feed pinion 53. In consequence of this arrangement, operating the starting relay 10 associated with a starting button not shown causes a change of styluses to occur each time the motor 3 is energized for the recording of a new message. Although the instant arrangement is preferred because of its simplicity, other well known modes of operation, such as periodically under clock control, or remotely, upon receipt of a suitably detected function signal, are feasible and contemplated.

An advantage obtained by the use of the foregoing arrangement is that the styluses are not discarded after an arbitrary interval, but are used to exhaustion, resulting in longer useful life of the stylus material than would otherwise be obtained. A further advantage lies in the unitary assembly of styluses and spool into a turret which can be stocked as a single replacement part of relatively low cost.

Another advantage of the present invention is the facility with which the stylus turret, due to its shape and central mounting means, can be replaced in the machine, as a result of which it is easier and quicker to replace a turret of eight styluses than it was formerly to replace a single stylus.

Still another advantage of this invention lies in the simplicity of its arrangement whereby eight styluses can be used to exhaustion without the need for any detecting devices of either a mechanical or electrical nature to determine the need for and initiate a change of styluses.

Although the present invention has been described in terms of a specific illustrative example thereof, it is obvious that various modifications and alterations can be made therein without departing from the essential inventive concept embodied therein, and it is therefore intended that the invention be subject only to the limitations specifically set forth in the appended claims.

We claim:

1. In a facsimile receiver which employs electric marking on a rotating drum covered with a recording sheet by means of a stylus advanced into resilient contact therewith, an advancing member, electrically actuated operating means in operative contact with said advancing member for advancing said member during a marking period, a stylus mounting bar resiliently advanced by said advancing member, stylus turret means pivotally affixed to the said stylus mounting bar and comprising a stylus mounting hub and a plurality of spaced radial styluses rigidly affixed thereto, and stylus turret rotating means comprising a fixedly pivoted pawl for resiliently engaging the said stylus turret means during movement of said stylus mounting bar.

2. In an electrographic facsimile machine, a rotatable drum, for supporting a recording sheet thereon, electromagnetically actuated stylus advancing means, a rotatable stylus turret advanceable into resilient stylus contact with the said marking sheet by the said advancing means, a plurality of spaced styluses mounted radially on the said stylus turret, and a fixedly hinged pawl disposed in the path of travel of the said stylus turret and engaged therewith in one direction of the said travel, whereby the stylus turret is rotated stepwise the amount of a said stylus space upon each such stylus advance.

3. In a facsimile recorder employing marking paper on a rotatable drum, the combination comprising a stylus advancing motor, a cam driven by said motor and a fixed fixed cam stop therefor, a lever swingably mounted on a fixed center and operatively engaged by the said cam, a stop pin in the said lever, an arm pivotally affixed to an end of the said lever and spring urged toward acute angular relationship therewith against the said stop pin, a stylus turret rotatably mounted on a remote end of said arm comprising a hub and a plurality of uniformly spaced styluses having axial ratcheting portions and radial marking portions thereon and adapted to be advanced into spring pressed stylus contact with the said marking paper, and a fixedly pivoted ratcheting pawl resiliently engageable with the said ratcheting portions of the said stylus turret to rotate the same.

4. In a facsimile recorder employing marking paper on a rotatable drum, the combination comprising a stylus advancing motor fixedly mounted adjacent to the drum, cam means actuated by the said motor, lever means pivoted on a fixed center for oscillation by contact with the said cam means, stop means to position the said lever means in a predetermined advanced position, an arm hinged to the said lever means and spring urged into angularity therewith, a stylus turret rotatably mounted for stepwise rotation thereon comprising an axle, a hub, and a plurality of paper marking styluses affixed radially to the said hub, the said stylus turret being so mounted at an extremity of the said arm for resilient stylus contact with the said marking paper, and a dog rotatable about a fixed center and spring pressed into engagement with the said stylus turret for stepwise rotation thereof upon oscillation of the said lever.

5. In an electric marking facsimile recorder having a rotatable drum adapted to support recording paper on the surface thereof, revolvable stylus turret means mounted adjacent to the said drum for relative scanning motion therewith, comprising a plurality of styluses mounted radially for stepwise rotation and a ratchet having a number of teeth corresponding to the number of said plurality of styluses, means to advance the said stylus turret means into resilient stylus contact with the said rotatable drum for message marking and to retract the same at end of message, a pawl, spring urged into operative engagement with the said mounting means and swingable about a fixed pivot, to rotate said turret means stepwise for positioning a new said stylus upon retraction of said turret means, and a pawl resiliently engaging said ratchet for indexing said stylus turret means.

6. In an electric marking facsimile recorder having a rotatable drum adapted to support a recording sheet on the surface thereof, multiple stylus mounting means revolvable about an axis for mounting a plurality of styluses in a radial array, a forwardly spring urged link having the said axis mounted thereon said link being swingable about a center of rotation for advancement into resilient stylus contact with said recording sheet, a pivot in said center of rotation, an arm containing the said pivot and containing a remote fixed pivot for swinging the said stylus out of engagement with the said rotatable drum, a pawl on a fixed pivot, spring urged into engagement with the said mounting means for forwardly indexing rotation thereof during swinging of the said arm, and a resiliently positioned pawl on the said link engaging said mounting means to prevent reverse rotation thereof.

References Cited in the file of this patent

UNITED STATES PATENTS

| | | |
|---|---|---|
| 1,120,841 | Norris | Dec. 15, 1914 |
| 2,607,654 | Ridings et al. | Aug. 19, 1952 |